(12) United States Patent
Xu

(10) Patent No.: US 12,384,450 B2
(45) Date of Patent: Aug. 12, 2025

(54) SYSTEMS AND METHODS FOR COOPERATIVE VEHICLE OPERATION IN ADVANCED DRIVER ASSISTANCE SYSTEM MODE

(71) Applicant: STEERING SOLUTIONS IP HOLDING CORPORATION, Saginaw, MI (US)

(72) Inventor: Kaiser Xu, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 178 days.

(21) Appl. No.: 18/318,657

(22) Filed: May 16, 2023

(65) Prior Publication Data

US 2024/0375706 A1 Nov. 14, 2024

(30) Foreign Application Priority Data

May 8, 2023 (CN) .......................... 202310514239.X

(51) Int. Cl.
*B62D 5/04* (2006.01)
*B62D 6/00* (2006.01)

(52) U.S. Cl.
CPC .......... *B62D 5/0463* (2013.01); *B62D 5/0484* (2013.01); *B62D 6/008* (2013.01)

(58) Field of Classification Search
CPC .................................................. B62D 5/0463
See application file for complete search history.

(56) References Cited

U.S. PATENT DOCUMENTS

| | | | | |
|---|---|---|---|---|
| 10,996,673 | B1* | 5/2021 | Katzourakis | ........... G05D 1/021 |
| 11,312,410 | B2* | 4/2022 | Sekiya | ...................... B62D 6/04 |
| 2018/0099692 | A1* | 4/2018 | Oya | ....................... B62D 6/006 |
| 2018/0178834 | A1* | 6/2018 | Moreillon | ................ B62D 6/10 |
| 2018/0178838 | A1* | 6/2018 | Inoue | ................... B62D 15/025 |
| 2018/0181130 | A1* | 6/2018 | Inoue | .................... B62D 5/0457 |
| 2020/0262475 | A1* | 8/2020 | Stahl | .................... G05D 1/0061 |
| 2020/0391789 | A1* | 12/2020 | Kim | ....................... B62D 6/002 |
| 2022/0169306 | A1* | 6/2022 | Ramanujam | ......... B62D 5/0463 |
| 2022/0297746 | A1* | 9/2022 | Washnock | ........... B62D 5/0427 |
| 2023/0126269 | A1* | 4/2023 | Kim | ..................... B62D 15/025 |
| | | | | 701/23 |

FOREIGN PATENT DOCUMENTS

DE 102020116196 A1 12/2020
DE 102021117307 A1 5/2022

* cited by examiner

*Primary Examiner* — Long T Tran
(74) *Attorney, Agent, or Firm* — Dickinson Wright PLLC

(57) ABSTRACT

A method for cooperative vehicle operation includes receiving a first target angle signal associated with a handwheel of a vehicle, receiving a second target angle signal associated with an autonomous steering system of the vehicle, and, in response to a determination that a handwheel angle error between the first target angle signal and the second target angle signal is less than a handwheel error threshold: generating a handwheel motor torque command based on a position control motor torque command and a torque control motor torque command; and controlling a position of the handwheel of the vehicle based on the handwheel motor torque command.

18 Claims, 6 Drawing Sheets

SYSTEMS AND METHODS FOR COOPERATIVE VEHICLE OPERATION IN ADVANCED DRIVER ASSISTANCE SYSTEM MODE

CROSS-REFERENCES TO RELATED APPLICATIONS

This patent application claims priority to China Patent Application Serial No. 202310514239. X, filed May 8, 2023, which is incorporated herein by reference in its entirety.

TECHNICAL FIELD

This disclosure relates to cooperative vehicle operation and in particular to cooperative driving in an advanced driver assistance system mode.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Increasingly, such vehicles are including or using advanced driver assistance systems that assist (e.g., autonomously or semi-autonomously) in one or more vehicle operations, such as vehicle steering and/or other vehicle operation. Under certain conditions, the driver of the vehicle and the advanced driver assistance system may cooperatively perform such vehicle operations.

SUMMARY OF THE INVENTION

This disclosure relates generally to cooperative vehicle operation vehicle lateral control.

An aspect of the disclosed embodiments includes a method for cooperative vehicle operation. The method includes receiving a first target angle signal associated with a handwheel of a vehicle, receiving a second target angle signal associated with an autonomous steering system of the vehicle, and, in response to a determination that a handwheel angle error between the first target angle signal and the second target angle signal is less than a handwheel error threshold: generating a handwheel motor torque command based on a position control motor torque command and a torque control motor torque command; and controlling a position of the handwheel of the vehicle based on the handwheel motor torque command.

Another aspect of the disclosed embodiments includes a system for cooperative vehicle operation. The system includes a processor and a memory. The memory includes instructions that, when executed by the processor, cause the processor to: receive a first target angle signal associated with a handwheel of a vehicle; receive a second target angle signal associated with an autonomous steering system of the vehicle; and, in response to a determination that a handwheel angle error between the first target angle signal and the second target angle signal is less than a handwheel error threshold: generate a handwheel motor torque command based on a position control motor torque command and a torque control motor torque command; and control a position of the handwheel of the vehicle based on the handwheel motor torque command.

Another aspect of the disclosed embodiments includes an apparatus for cooperative vehicle operation. The apparatus includes a processor and a memory. The memory includes instructions that, when executed by the processor, cause the processor to: receive a first target angle signal associated with a handwheel of a vehicle; receive a second target angle signal associated with an autonomous steering system of the vehicle; and, in response to a determination that a handwheel angle error between the first target angle signal and the second target angle signal is less than a handwheel error threshold: generate a handwheel motor torque command based on a position control motor torque command and a torque control motor torque command; apply a slew rate to the handwheel motor torque command; and control a position of the handwheel of the vehicle based on the handwheel motor torque command. The instructions further cause the processor to receive a rack position signal indicating an actual position of a rack of the vehicle; determine a reference rack positon based on the first target angle signal and the second target angle signal; and, in response to a determination that a rack position error is less than a rack position threshold: generate a rack positon command based on the position control motor torque command and the torque control motor torque command; and control a position of the rack of the vehicle based on the rack position command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Increasingly, such vehicles are including or using advanced driver assistance systems (ADAS) that assist (e.g., autonomously or semi-autonomously) in one or more vehicle operations, such as vehicle steering and/or other vehicle operation. Under certain conditions, the driver of the vehicle and the ADAS may cooperatively perform such vehicle operations.

In ADAS mode of a SbW system, an associated handwheel of the vehicle may rotate with an associated roadwheel actuator (RWA) (e.g., such features may be associated with level 2 or level 3 ADAS systems or other suitable ADAS systems) or may return to center and stay in silent model (e.g., not moving with the roadwheel actuator), which may be associated with a low-speed range (e.g., in level 3 and above or other suitable ADAS systems).

In an ADAS system where the handwheel of the vehicle rotates with the RWA, an operator or driver of the vehicle may cooperatively operate the vehicle with the ADAS system (e.g., as the operator takes over vehicle control by engaging the handwheel, during performance of vehicle control by the ADAS system). Typically, to accommodate cooperative driving and control of SbW system, a controller may apply an angle overlay to the ADAS system, to achieve targets during cooperative driving. Such targets may include a minimum impact on ADAS performance, provide an optimized steering feel during cooperative driving and during the transition between ADAS control and human driving, and to provide smooth transition of steering feel and vehicle lateral control between ADAS mode and normal driving mode.

Figure 3:
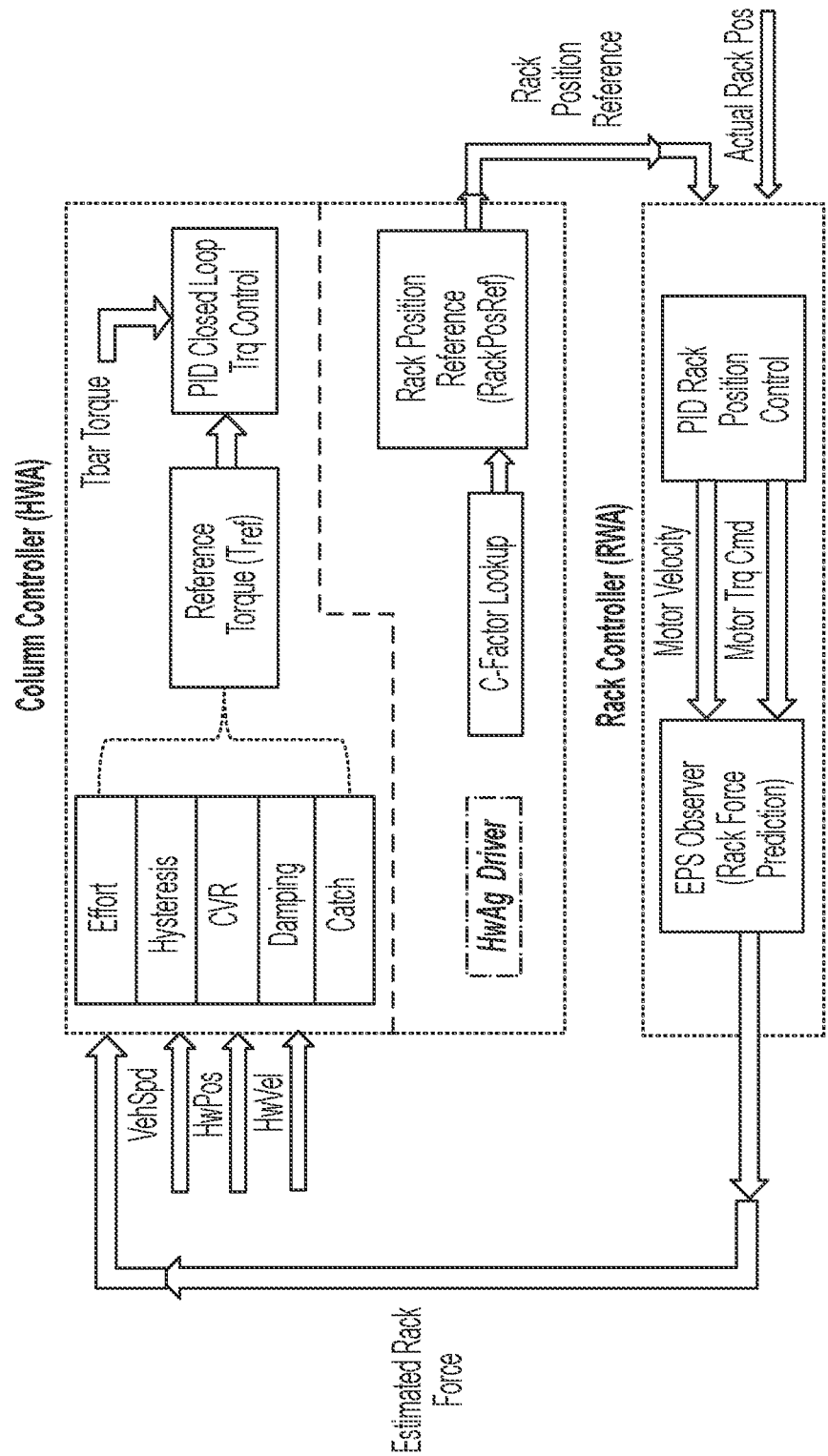
FIG. 3 generally illustrates a cooperative vehicle operation control system according to the principles of the present disclosure.

Accordingly, systems and methods, such as those described herein, configured to provide cooperative vehicle operation in an ADAS mode, may be desirable. In some embodiments, the systems and methods described herein may be configured to provide handwheel actuator (HWA) control. For example, the systems and methods described herein may be configured to receive an estimated rack force signal from a RWA rack force observer, as is generally illustrated in FIG. 3. The systems and methods described herein may be configured to use the estimated rack force and one or more other input signals (e.g., such as vehicle speed, handwheel position, handwheel velocity, and/or any other suitable input signal) to generate a reference torque as the sum of outputs of individual features of effort, hysteresis, return correction (e.g., CVR), damping, catch, and/or any other suitable features. The systems and methods described herein may be configured to use a proportional-integral-derivative (PID) closed loop torque controller to calculate a final HWA motor torque command.

In some embodiments, the systems and methods described herein may be configured to provide RWA control.

The systems and methods described herein may be configured to use a handwheel angle (HwAg) from the driver (HwAg Driver) as input of a C-factor lookup module to generate a reference rack position (RackPosRef), based on the HwAg and a C-Factor.

The systems and methods described herein may be configured to, based on the error between reference rack position and the actual rack position, use a PID Rack position controller to control (e.g., or other suitable position controller or other controller) a RWA rack position to follow an intention of the driver (e.g., corresponding to HwAg Driver).

Figure 4:
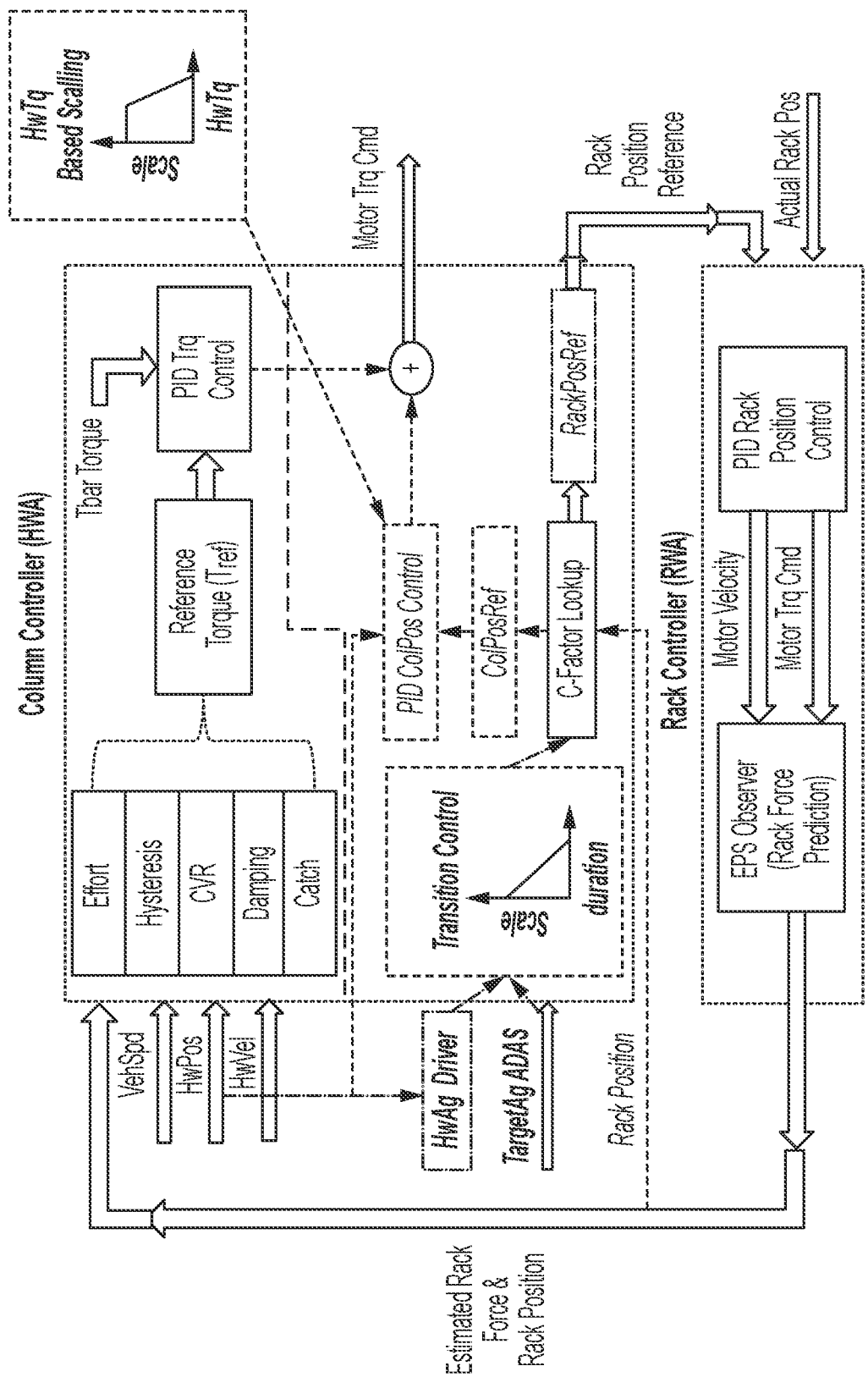
FIG. 4 generally illustrates an alternative cooperative vehicle operation control system according to the principles of the present disclosure.

As is generally illustrated in FIG. 4, the systems and methods described herein may be configured to disable a torque controller and use a column position controller to keep the HWA following the movement of RWA. The systems and methods described herein may be configured to generate a HWA motor torque command and provide handwheel torque (HwTq) simulation.

The systems and methods described herein may be configured to keep the torque controller enabled (e.g., some of the torque generator features may be disabled through calibrations), while using the column position controller to allow the HWA to rotate by following the RWA.

In some embodiments, the systems and methods descried herein may be configured to keep the HWA rotating by following RWA movement using a column position controller (PID ColPos Control) (e.g., which may include a closed loop PID controller based on the angle error between thea column position reference (ColPosRef) and actual HWA column position). The systems and methods described herein may be configured to calculate the ColPosRef by inversely looking up the C-factor table with rack position.

In some embodiments, the systems and methods described herein may be configured to provide override and transition control. The systems and methods described herein may be configured to provide an override strategy that is based on the RWA rack position and the HWA column position angle error. The systems and methods described herein may be configured to provide override in response to a calibratable error threshold being triggered. The column position control may be disabled when override occurs.

The systems and methods described herein may be configured to determine the angle error threshold (e.g., which is vehicle speed dependent) based on vehicle evaluation of vehicle lateral response, lane deviation, and/or HwTq. The systems and methods described herein may be configured to avoid an excessive override effort using various tuning of the column position controller.

In some embodiments, the systems and methods described herein may be configured to, during the transition between ADAS and human driving, apply a slew rate control to the final motor torque command for a calibratable duration. Additionally, or alternatively, the systems and methods described herein may be configured to use a linear interpolation between the final motor torque commands from column position controller and column torque controller, which may result in improved transition control. That is:

Motor torque $Cmd =$ $$MotTqCmdColPos * \text{scale} + MotTqCmdColTq * (1 - \text{scale})$$

The systems and methods described herein may be configured to use an HwTq based scale factor applied to the integration term angle error of the PID ColPos controller.

The scale factor may be calibrated in any suitable manner and at least as illustrated in FIG. 4 (e.g., equal to 1 for HwTq below threshold value one and ramped down to 0 at threshold value two), such that, optimized steering feel may be achieved during cooperative driving.

Figure 5:
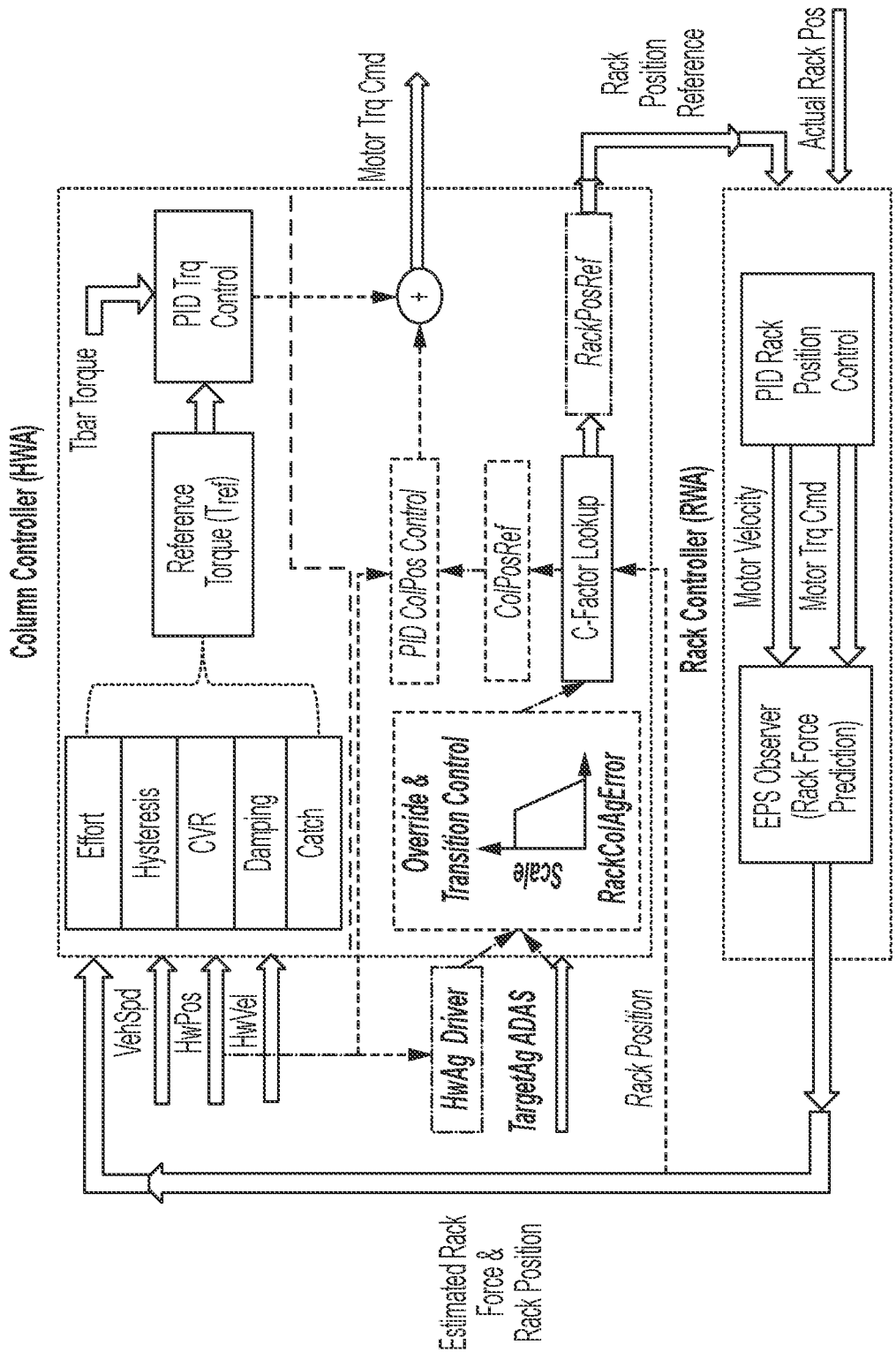
FIG. 5 generally illustrates an alternative cooperative vehicle operation control system according to the principles of the present disclosure.

In some embodiments, the systems and methods described herein may be configure to provide RWA control, as is generally illustrated in FIG. 5. The systems and methods described herein may be configured to use a rack controller in cooperative mode (e.g., such as when the driver is engaged with the handwheel at the same or substantially the same time as the ADAS system is controlling at least a portion of vehicle operations, such as vehicle steering), which is based on the error between reference rack position and an actual rack position.

During cooperative driving with one or more ADAS functions of the ADAS system, the systems and methods described herein may be configured to generate the reference rack position based on an ADAS target angle (TargetAg ADAS) and an HWA handwheel angle (HWAg Driver).

In some embodiments, the systems and methods described herein may be configured to provide override and transition control. For example, the systems and methods described herein may be configured to calculate a scale factor using a lookup table with rack and column angle error, and the reference rack position before the C-factor conversion is calculated as:

$$PreRackPosRef = TargetAg * Scale + HwAga * (1 - Scale)$$

The scale factor may be calibrated in any suitable manner and at least as illustrated in FIG. 5 (e.g., equal to 1 for RackColAgError below threshold value one and ramped down to 0 at threshold value two), such that a smooth transition between ADAS driving and human driving can be achieved, while minimizing or reducing the impact on ADAS control performance.

In some embodiments, the ADAS system may generate a constant target angle (e.g., such as 10 degrees or other suitable angle). The driver may engage the handwheel, while the ADAS system is controlling vehicle steering, which may cause the handwheel angle to be different from the target angle (e.g., changing from 10 degrees to 35 degrees, or any other suitable change). The override angle error threshold may be set to any suitable angle, such as 15 degrees or other suitable angle. The systems and methods described herein may be configured to provide rack position transition control, responsive to the driver engaging the handwheel. For an angle error (e.g., HWA angle minus ADAS target angle) between an upper bound (e.g., the angle error threshold) and a lower bound (e.g., 5 degrees or other suitable angle), the systems and methods described herein may be configured to transition from ADAS mode to human control. Additionally, or alternatively, for an angle error less than the lower bound, ADAS tracking performance may not be affected. Additionally, or alternatively, for an angle error that is greater than the upper bound, the systems and methods described herein may be configured to allow the driver to take control and the RWA follows the angle command from the HWA.

In some embodiments, the systems and methods described herein may be configured to provide handwheel torque (HwTq) transition control. For example, for an HwTq value that is less than a threshold (e.g., 2 Newton meters (Nm) or other suitable value), the systems and methods described herein may be configured to operate the column position control in a normal state (e.g., unchanged). Additionally, or alternatively, for an HwTq value that is greater than the threshold, the systems and methods described herein may be configured to control an I-term of the column position controller, which may correspond to a last value of the column position controller.

In some embodiments, for an angle error higher than the override angle error threshold (e.g., the upper bound), the systems and methods described herein may be configured to allow the driver to take over and to blend the motor torque command from output of column position controller to output of column torque controller.

In some embodiments, the systems and methods described herein may be configured to provide SbW control logic in cooperative driving mode with angle overlay ADAS. The systems and methods described herein may be configured to provide two HWA control options during cooperative driving. The systems and methods described herein may be configured to provide an override strategy and transition control logic of HWA (e.g., including duration scale and HwTq based scale). The systems and methods described herein may be configured to provide RWA control logic during cooperative driving (e.g., including generation of the reference rack position based on both column position and ADAS target angle). The systems and methods described herein may be configured to provide an override strategy and transition control logic of RWA. The systems and methods described herein may be configured to allow the HWA to follow the RWA and/or allow the HWA to operate in silent mode.

In some embodiments, the systems and methods described herein may be configured to receive a first target angle signal associated with a handwheel of a vehicle. The systems and methods described herein may be configured to receive a second target angle signal associated with an autonomous steering system of the vehicle (e.g., such as the ADAS system). The systems and methods described herein may be configured to, in response to a determination that a handwheel angle error between the first target angle signal and the second target angle signal is less than a handwheel error threshold, (i) generate a handwheel motor torque command based on a position control motor torque command and a torque control motor torque command, and (ii) control a position of the handwheel of the vehicle based on the handwheel motor torque command. The systems and methods described herein may be configured to control the position of the handwheel of the vehicle by applying a slew rate to the handwheel motor torque command. The systems and methods described herein may be configured to determine the handwheel error threshold based on a vehicle speed and/or any other suitable input or vehicle characteristic.

In some embodiments, the systems and methods described herein may be configured to generate the handwheel motor torque command based on the position control motor torque command and the torque control motor torque command using a PID torque controller to generate the handwheel motor torque command. The PID torque controller may include a closed loop PID torque controller.

In some embodiments, the systems and methods described herein may be configured to provide handwheel torque handling of the HWA and rack position handling of the RWA. For handwheel torque handling of the HWA, the systems and methods described herein may be configured to disable the handwheel torque controller that is used for handwheel torque generation in normal driving conditions without using the ADAS (e.g., using the column position controller to generate the handwheel torque). Additionally, or alternatively, the systems and methods described herein may be configured to keep the handwheel torque controller enabled and use the column position controller to keep the synchronization between the HWA and the RWA. Regarding rack position handling of the RWA, the systems and methods described herein may be configured to receive a first target angle signal associated with the handwheel of the vehicle and to receive a second target angle signal associated with an autonomous steering system of the vehicle. The systems and methods described herein may be configured to generate a final target position command for the RWA based on the angle error between the first target angle signal and the second angle signal. Through a position controller, the systems and methods described herein may be configured to generate a torque command of the RWA, which may allow the cooperative vehicle lateral control to be realized.

In some embodiments, the systems and methods described herein may be configured to use two sets of processors and memories. The first memory may include instructions that, when executed by the first processor, cause the first processor to: generate a first handwheel torque command trough a handwheel torque controller and generate a second handwheel torque command through a column position controller. Via a handwheel torque command arbitration, the final handwheel torque command is generated. The second memory includes instructions that, when executed by the second processor, cause the second processor to: receive a first target angle signal associated with a handwheel of a vehicle; receive a second target angle signal associated with an autonomous steering system of the vehicle; and generate a final target position command for the RWA based on the angle error between the first target angle signal and the second angle signal. Through a position controller, a torque command of the RWA is generated and the cooperative vehicle lateral control is realized.

In some embodiments, the systems and methods described herein may be configured to receive a rack position signal indicating an actual position of a rack of the vehicle. The systems and methods described herein may be configured to determine a reference rack positon based on the first target angle signal and the second target angle signal. The systems and methods described herein may be configured to, in response to a determination that a rack position error is less than a rack position threshold, (i) generate a rack positon command based on the position control motor torque command and the torque control motor torque command, and (ii) control a position of the rack of the vehicle based on the rack position command.

Figure 1:
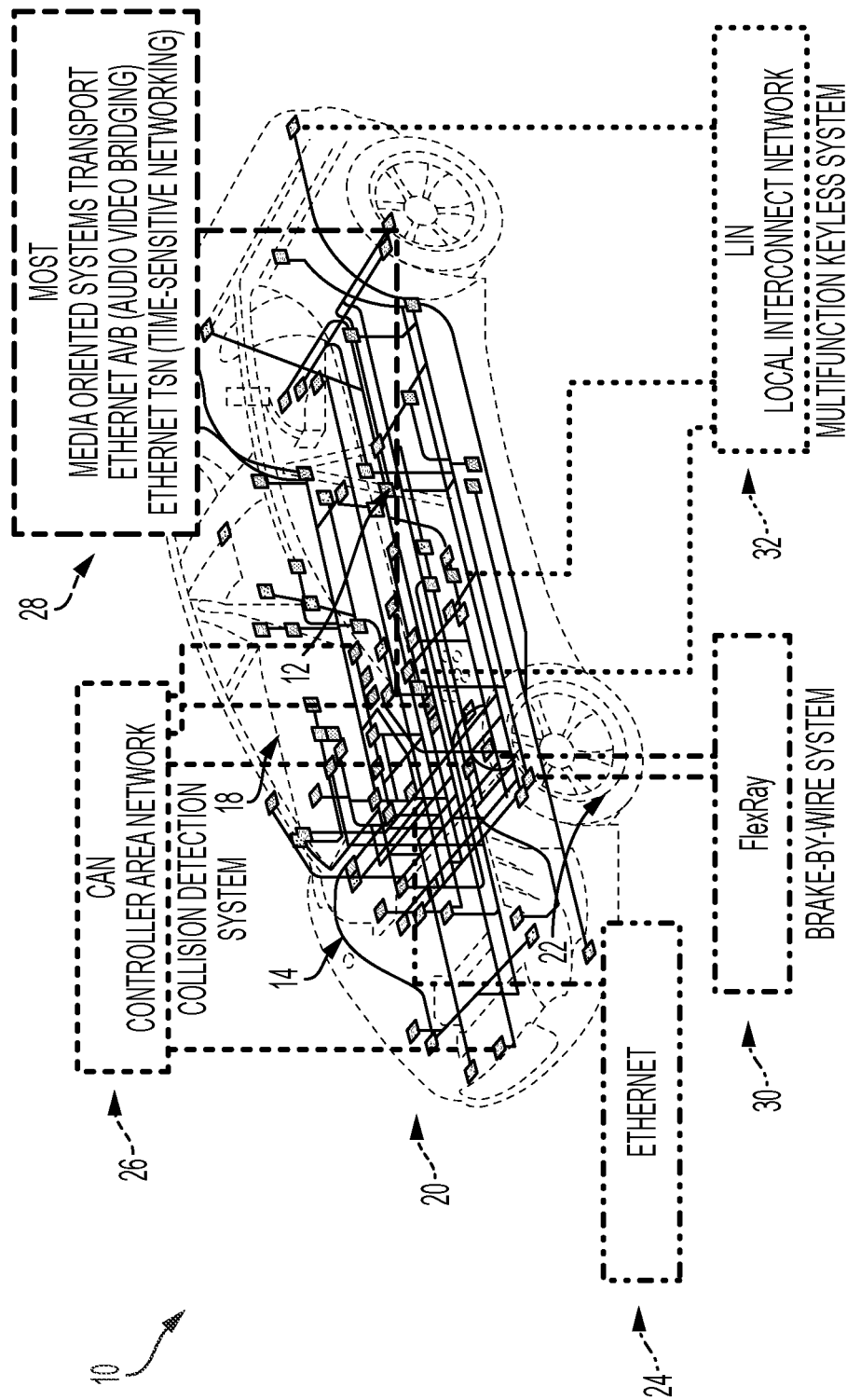
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
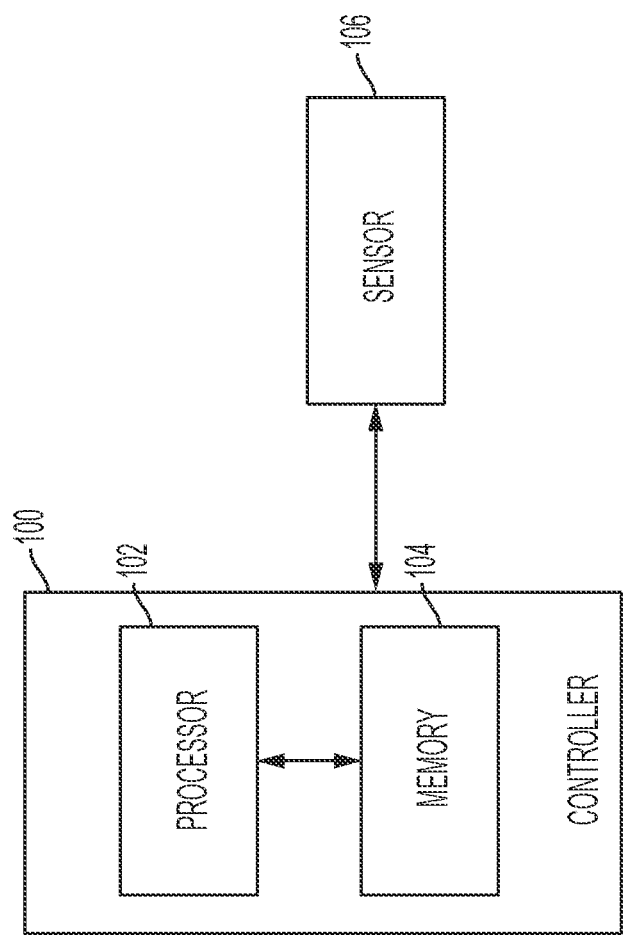
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, controller 100 may be configured to provide cooperative vehicle operation, as described. For example, the controller 100 may receive a first target angle signal associated with the handwheel of the vehicle 10. The controller 100 may receive a second target angle signal associated with an autonomous steering system of the vehicle 10 (e.g., such as the ADAS system). The controller 100 may, in response to a determination that a handwheel angle error between the first target angle signal and the second target angle signal is less than a handwheel error threshold, (i) generate a handwheel motor torque command based on a position control motor torque command and a torque control motor torque command, and (ii) control a position and/or an effort of the handwheel of the vehicle 10 based on the handwheel motor torque command. The controller 100 may control the position and/or the effort of the handwheel of the vehicle 10 by applying a slew rate to the handwheel motor torque command. The controller 100 may determine the handwheel error threshold based on a vehicle speed and/or any other suitable input or vehicle characteristic of the vehicle 10 for driver takeover determination.

In some embodiments, the controller 100 may generate the handwheel motor torque command based on the position control motor torque command and the torque control motor torque command using a PID torque controller to generate the handwheel motor torque command. The PID torque controller may include a closed loop PID torque controller.

In some embodiments, the controller 100 may receive a rack position signal indicating an actual position of a rack of the vehicle 10. The controller 100 may determine a reference rack positon based on the first target angle signal and the second target angle signal. The controller 100 may, in response to a determination that a rack position error is less than a rack position threshold, (i) generate a rack positon command based on the position control motor torque command and the torque control motor torque command and/or the angle error between the actual rack position of the reference rack position, and (ii) control a position of the rack of the vehicle 10 based on the rack position command.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 6:
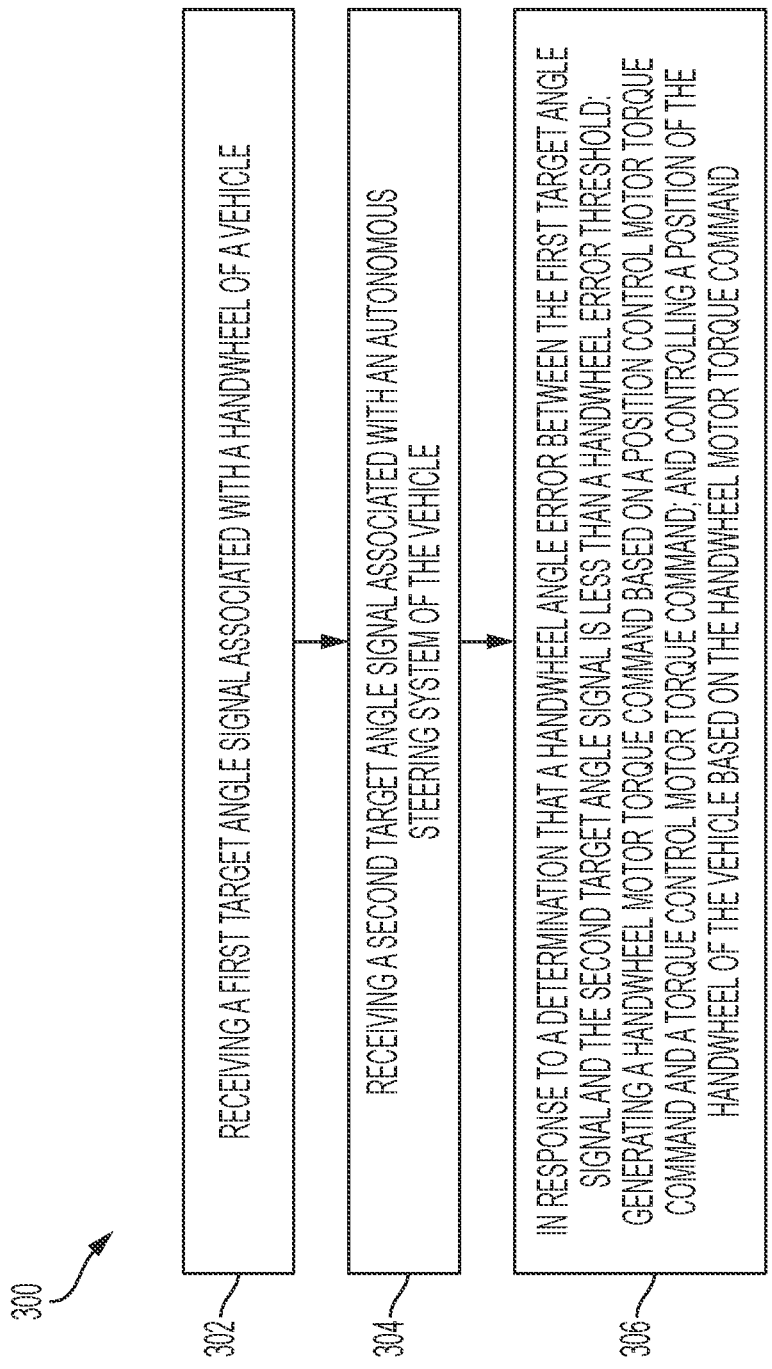
FIG. 6 is a flow diagram generally illustrating a cooperative vehicle operation control method according to the principles of the present disclosure.

FIG. 6 is a flow diagram generally illustrating a cooperative vehicle operation control method 300, according to the principles of the present disclosure. At 302, the method 300 receive a first target angle signal associated with a handwheel of a vehicle. For example, the controller 100 may receive the first target angle signal associated with the handwheel of the vehicle 10.

At 304, the method 300 receives a second target angle signal associated with an autonomous steering system of the vehicle. For example the controller 100 may receive the second target angle signal associated with the ADAS system of the vehicle 10.

At 306, the method 300, in response to a determination that a handwheel angle error between the first target angle signal and the second target angle signal is less than a handwheel error threshold, (i) generates a handwheel motor torque command based on a position control motor torque command and a torque control motor torque command, and (ii) controls a position of the handwheel of the vehicle based on the handwheel motor torque command. For example, the controller 100 may, in response to the determination that the handwheel angle error between the first target angle signal and the second target angle signal is less than the handwheel error threshold, (i) generate the handwheel motor torque command based on the position control motor torque command and the torque control motor torque command, and (ii) control the position of the handwheel of the vehicle 10 based on the handwheel motor torque command.

In some embodiments, the method 300 may receive a rack position signal indicating an actual position of a rack of the vehicle. For example, the controller 100 may receive the rack position signal indicating the actual position of the rack of the vehicle 10.

The method 30 may determine a reference rack positon based on the first target angle signal and the second target angle signal. For example, the controller 100 may determine the reference rack position based on the first target angle signal and the second target angle signal.

The method 300 may, in response to a determination that a rack position error is less than a rack position threshold, generate a rack positon command on the angle error between the actual rack position of the reference rack position, and control a position of the rack of the vehicle based on the rack position command. For example, the controller 100 may, in response to the determination that the rack position error is less than the rack position threshold, generate the rack positon command on the angle error between the actual rack position of the reference rack position, and control the position of the rack of the vehicle 10 based on the rack position command.

In some embodiments, a method for cooperative vehicle operation includes receiving a first target angle signal associated with a handwheel of a vehicle, receiving a second target angle signal associated with an autonomous steering system of the vehicle, and, in response to a determination that a handwheel angle error between the first target angle signal and the second target angle signal is less than a handwheel error threshold: generating a handwheel motor torque command based on a position control motor torque command and a torque control motor torque command; and controlling a position of the handwheel of the vehicle based on the handwheel motor torque command.

In some embodiments, controlling the position of the handwheel of the vehicle based on the handwheel motor torque command includes applying a slew rate to the handwheel motor torque command. In some embodiments, the method also includes receiving a rack position signal indicating an actual position of a rack of the vehicle, and determining a reference rack positon based on the first target angle signal and the second target angle signal. In some embodiments, the method also includes, in response to a determination that a rack position error is less than a rack position threshold, generating a rack positon command based on the position control motor torque command and the torque control motor torque command, and controlling a position of the rack of the vehicle based on the rack position command. In some embodiments, the handwheel error threshold is determined based on at least a vehicle speed. In some embodiments, generating the handwheel motor torque command based on the position control motor torque command and the torque control motor torque command includes using a proportional-integral-derivative torque controller to generate the handwheel motor torque command. In some embodiments, the proportional-integral-derivative torque controller includes a closed loop proportional-integral-derivative torque controller. In some embodiments, the handwheel of the vehicle is associated with an electronic power steering system. In some embodiments, the handwheel of the vehicle is associated with a steer-by-wire steering system.

In some embodiments, a system for cooperative vehicle operation includes a processor and a memory. The memory includes instructions that, when executed by the processor, cause the processor to: receive a first target angle signal associated with a handwheel of a vehicle; receive a second target angle signal associated with an autonomous steering system of the vehicle; and, in response to a determination that a handwheel angle error between the first target angle signal and the second target angle signal is less than a handwheel error threshold: generate a handwheel motor torque command based on a position control motor torque command and a torque control motor torque command; and control a position of the handwheel of the vehicle based on the handwheel motor torque command.

In some embodiments, the instructions further cause the processor to control the position of the handwheel of the vehicle by applying a slew rate to the handwheel motor torque command. In some embodiments, the instructions further cause the processor to: receive a rack position signal indicating an actual position of a rack of the vehicle; and determine a reference rack positon based on the first target angle signal and the second target angle signal. In some embodiments, the instructions further cause the processor to, in response to a determination that a rack position error is less than a rack position threshold: generate a rack positon command based on the position control motor torque command and the torque control motor torque command; and control a position of the rack of the vehicle based on the rack position command. In some embodiments, the handwheel error threshold is determined based on at least a vehicle speed. In some embodiments, the instructions further cause the processor to generate the handwheel motor torque command based on the position control motor torque command and the torque control motor torque command using a proportional-integral-derivative torque controller to generate the handwheel motor torque command. In some embodiments, the proportional-integral-derivative torque controller includes a closed loop proportional-integral-derivative torque controller. In some embodiments, the handwheel of the vehicle is associated with an electronic power steering system. In some embodiments, the handwheel of the vehicle is associated with a steer-by-wire steering system.

In some embodiments, an apparatus for cooperative vehicle operation includes a processor and a memory. The memory includes instructions that, when executed by the processor, cause the processor to: receive a first target angle signal associated with a handwheel of a vehicle; receive a second target angle signal associated with an autonomous steering system of the vehicle; and, in response to a determination that a handwheel angle error between the first target angle signal and the second target angle signal is less than a handwheel error threshold: generate a handwheel motor torque command based on a position control motor torque command and a torque control motor torque command; apply a slew rate to the handwheel motor torque command; and control a position of the handwheel of the vehicle based on the handwheel motor torque command. The instructions further cause the processor to receive a rack position signal indicating an actual position of a rack of the vehicle; determine a reference rack positon based on the first target angle signal and the second target angle signal; and, in response to a determination that a rack position error is less than a rack position threshold: generate a rack positon command based on the position control motor torque command and the torque control motor torque command; and control a position of the rack of the vehicle based on the rack position command.

In some embodiments, the instructions further cause the processor to generate the handwheel motor torque command based on the position control motor torque command and the torque control motor torque command using a proportional-integral-derivative torque controller to generate the handwheel motor torque command.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for cooperative vehicle operation, the method comprising:
   receiving a first target angle signal associated with a handwheel of a vehicle;
   receiving a second target angle signal associated with an autonomous steering system of the vehicle; and
   in response to a determination that a handwheel angle error between the first target angle signal and the second target angle signal is less than a handwheel error threshold:
      generating a handwheel motor torque command based on a position control motor torque command and a torque control motor torque command; and
      controlling a position of the handwheel of the vehicle based on the handwheel motor torque command, wherein controlling the position of the handwheel of the vehicle includes applying a slew rate to the handwheel motor torque command.

2. The method of claim 1, further comprising receiving a rack position signal indicating an actual position of a rack of the vehicle; and
   determining a reference rack positon based on the first target angle signal and the second target angle signal.

3. The method of claim 2, further comprising, in response to a determination that a rack position error is less than a rack position threshold:
   generating a rack positon command; and
   controlling a position of the rack of the vehicle based on the rack position command.

4. The method of claim 1, wherein the handwheel error threshold is determined based on at least a vehicle speed.

5. The method of claim 1, wherein generating the handwheel motor torque command based on the position control motor torque command and the torque control motor torque command includes using a proportional-integral-derivative torque controller to generate the handwheel motor torque command.

6. The method of claim 5, wherein the proportional-integral-derivative torque controller includes a closed loop proportional-integral-derivative torque controller.

7. The method of claim 1, wherein the handwheel of the vehicle is associated with an electronic power steering system.

8. The method of claim 1, wherein the handwheel of the vehicle is associated with a steer-by-wire steering system.

9. A system for cooperative vehicle operation, the system comprising:
a processor; and
a memory including instructions that, when executed by the processor, cause the processor to:
receive a first target angle signal associated with a handwheel of a vehicle;
receive a second target angle signal associated with an autonomous steering system of the vehicle; and
in response to a determination that a handwheel angle error between the first target angle signal and the second target angle signal is less than a handwheel error threshold:
generate a handwheel motor torque command based on a position control motor torque command and a torque control motor torque command; and
control a position of the handwheel of the vehicle based on the handwheel motor torque command by applying a slew rate to the handwheel motor torque command.

10. The system of claim 9, wherein the instructions further cause the processor to receive a rack position signal indicating an actual position of a rack of the vehicle; and
determine a reference rack positon based on the first target angle signal and the second target angle signal.

11. The system of claim 10, wherein the instructions further cause the processor to, in response to a determination that a rack position error is less than a rack position threshold:
generate a rack positon command based on the position control motor torque command and the torque control motor torque command; and
control a position of the rack of the vehicle based on the rack position command.

12. The system of claim 9, wherein the handwheel error threshold is determined based on at least a vehicle speed.

13. The system of claim 9, wherein the instructions further cause the processor to generate the handwheel motor torque command based on the position control motor torque command and the torque control motor torque command using a proportional-integral-derivative torque controller to generate the handwheel motor torque command.

14. The system of claim 13, wherein the proportional-integral-derivative torque controller includes a closed loop proportional-integral-derivative torque controller.

15. The system of claim 9, wherein the handwheel of the vehicle is associated with an electronic power steering system.

16. The system of claim 9, wherein the handwheel of the vehicle is associated with a steer-by-wire steering system.

17. An apparatus for cooperative vehicle operation, the apparatus comprising:
a processor; and
a memory including instructions that, when executed by the processor, cause the processor to:
receive a first target angle signal associated with a handwheel of a vehicle;
receive a second target angle signal associated with an autonomous steering system of the vehicle;
in response to a determination that a handwheel angle error between the first target angle signal and the second target angle signal is less than a handwheel error threshold:
generate a handwheel motor torque command based on a position control motor torque command and a torque control motor torque command;
apply a slew rate to the handwheel motor torque command; and
control a position of the handwheel of the vehicle based on the handwheel motor torque command;
receive a rack position signal indicating an actual position of a rack of the vehicle;
determine a reference rack positon based on the first target angle signal and the second target angle signal; and
in response to a determination that a rack position error is less than a rack position threshold:
generate a rack positon command based on the position control motor torque command and the torque control motor torque command; and
control a position of the rack of the vehicle based on the rack position command.

18. The apparatus of claim 17, wherein the instructions further cause the processor to generate the handwheel motor torque command based on the position control motor torque command and the torque control motor torque command using a proportional-integral-derivative torque controller to generate the handwheel motor torque command.

\* \* \* \* \*